F. M. BLAIR & F. M. BLACK.
DEVICE FOR ARRESTING LIGHT RAYS.
APPLICATION FILED FEB. 27, 1917.
1,230,844.
Patented June 26, 1917.
2 SHEETS—SHEET 1.
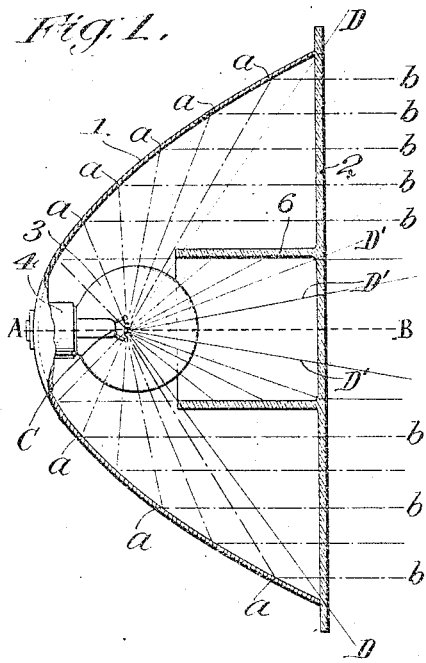
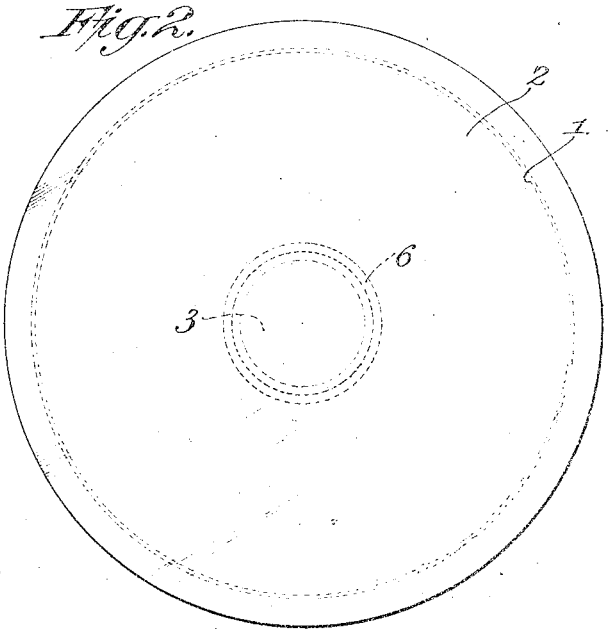
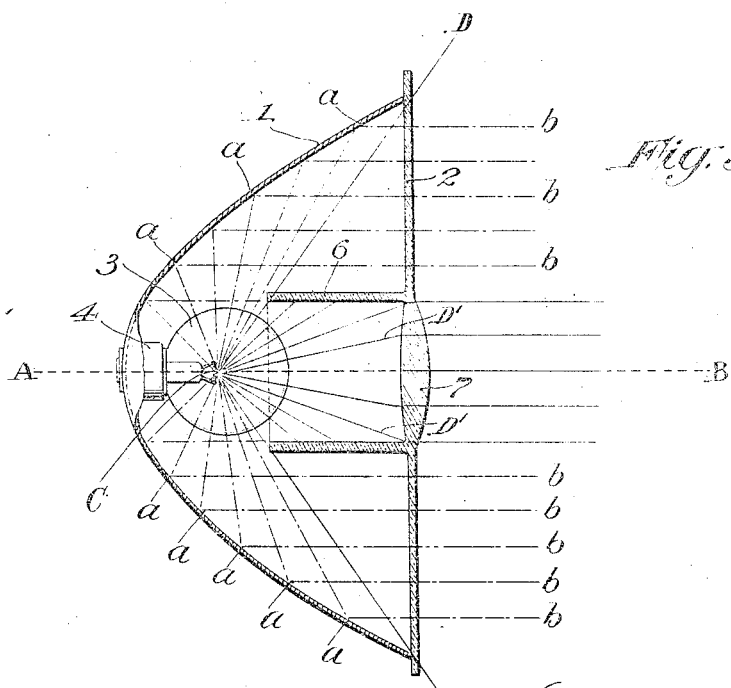
Inventors
Frank M Blair and
Frederic M Black
By Church & Church
Their Attorneys F. M. BLAIR & F. M. BLACK.
DEVICE FOR ARRESTING LIGHT RAYS.
APPLICATION FILED FEB. 27, 1917.
1,230,844.
Patented June 26, 1917.
2 SHEETS—SHEET 2.
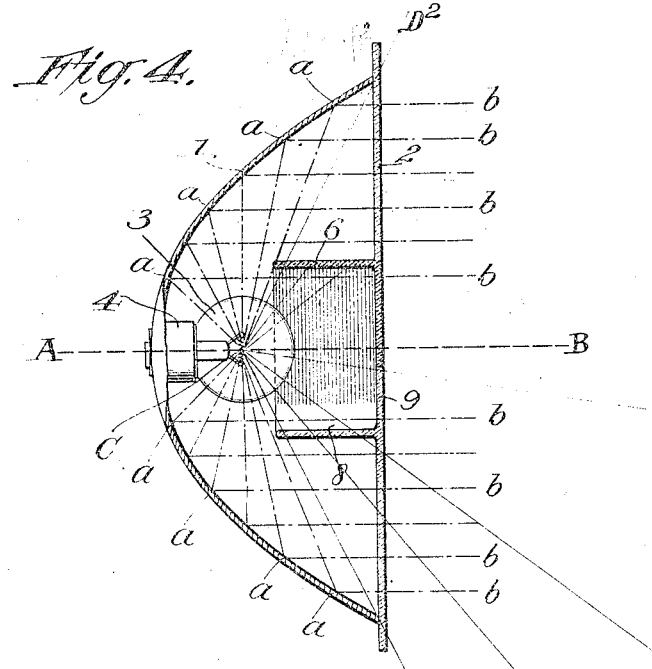
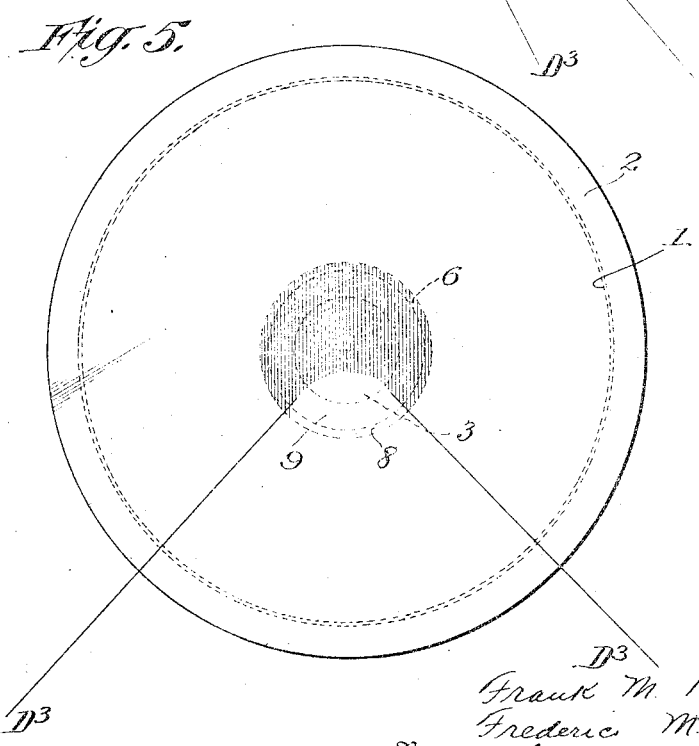
Inventors
Frank M. Blair and
Frederic M. Black
By Church Church
their Attorneys

UNITED STATES PATENT OFFICE.

FRANK M. BLAIR AND FREDERIC M. BLACK, OF NEWARK, OHIO.

DEVICE FOR ARRESTING LIGHT-RAYS.

1,230,844.   Specification of Letters Patent.   Patented June 26, 1917.

Application filed February 27, 1917. Serial No. 151,328.

*To all whom it may concern:*

Be it known that we, FRANK M. BLAIR and FREDERIC M. BLACK, citizens of the United States, residing at Newark, in the county of Licking and State of Ohio, have invented certain new and useful Improvements in Devices for Arresting Light-Rays; and we do hereby declare the following to be a full, clear, and exact description of the same when taken in connection with the accompanying drawings, forming part of this specification.

This invention relates to an improved device for arresting light rays, which is more especially adapted to be used in conjunction with headlights of the searchlight type, such as are commonly employed on automobiles, features of the invention, however, being capable of useful application in other types of lamps as well.

A device constructed in accordance with the present invention is particularly adapted for the purpose of arresting the objectionable un-reflected or direct rays from the source of light of a headlight, which diverge widely in front of the headlight, resulting in a curtain of light, so to speak, which is blinding to a person approaching the light and actually interferes with a view of the lighted surfaces in front of the headlight by a person stationed in a position behind the headlight. The curtain of light caused by the widely-divergent direct rays is particularly objectionable in thick weather, because the rays illuminate a mist, snow-particles in the air, or a fog, and practically obscure the view in front of the headlight. The present device for arresting these direct rays eliminates the above stated difficulties, and, in so doing, offers practically no obstruction whatever to the parallel reflected rays of the headlight, so that the efficiency of the latter is not impaired.

For a full understanding of the invention, reference is now made to the accompanying drawings, which illustrate a structural embodiment of the invention utilized in conjunction with a headlight of the type such as is commonly employed in automobiles and including a parabolic reflector for directing a straight beam of light in front of the headlight.

In the drawings:

Figure 1 is a section taken through the vertical center of a headlight employing a parabolic reflector and provided with the present improvements.

Fig. 2 is a front elevation of the same.

Fig. 3 is a view similar to Fig. 1 illustrating another modification.

Figs. 4 and 5 are views similar to Figs. 1 and 2 but illustrating another modification.

Like characters of reference in the several figures indicate the same parts.

For convenience all the forms of the invention are illustrated in connection with a headlight of a type commonly employed by automobiles and which embodies in its construction a parabolic reflector 1 on the front of which is mounted the usual front glass 2. A source of light is positioned to lie in the focal center of and in the longitudinal axis of the parabolic reflector, said axis being indicated by a dotted line A—B. The focal center of the reflector is designated by the reference character C. Any suitable source of light may be employed, of course, but in accordance with the present preferred practice, the source of light is an electric lamp 3 mounted on a lamp socket 4 secured to the reflector 1, and lying parallel with the axis A—B of the latter. In a headlight of this type, rays from the source of light are reflected by the parabolic reflector 1 through the front glass 2 in line substantially parallel with the axis A—B, as indicated by the dot-and-dash lines *a—b*, which substantially parallel rays cause a straight beam of light to be projected in front of the reflector.

Besides the parallel reflected rays *a—b*, widely-diverging unreflected or direct rays C—D, indicated by full lines pass from the source of light and would ordinarily spread out in front of the lamp to cause a luminous curtain, which, as hereinbefore stated is very objectionable, in that it is primarily the cause of the blinding light projected on a person closely approaching the lamp, and in heavy weather the cause of a very serious obstruction to the view toward the front of a person stationed behind the lamp. Primarily, the invention is directed to the provision of a novel device for intercepting or suppressing these highly objectionable direct rays, without in any manner interfering with the parallel reflected rays, so that a substantially straight beam of light may be projected in any predetermined direction and of any desired power. All of the widely-diverging direct rays from the source of light may be suppressed by this invention, or, in the case of an automobile, only the divergent rays projected upwardly from the headlight may be suppressed permitting the downwardly projecting diverging direct rays to illuminate the surface of the road directly in front of the automobile.

Referring now to Figs. 1 and 2 which illustrate an embodiment of the invention for suppressing or intercepting all of the widely-diverging direct rays—

As shown, a tube 6, is mounted on the front glass 2, the sides of the tube being positioned to intercept the widely diverging direct rays C—D throughout the entire 360 degrees of the vertical plane of the headlight. The tube 6 may be made of any suitable material adapted to intercept the direct rays C—D and prevent projection of these rays through the front glass 2. The tube 6 is illustrated as round in cross section, but the shape may obviously be varied, if desired. Said tube extends inwardly from the front glass 2 toward the lamp 3, the longitudinal axis of the tube coinciding, preferably, with the longitudinal axis A—B of the reflector and lamp. It is also preferable that the diameter of the tube be greater than the vertical diameter of the lamp, so that the front portion of the lamp may extend partially within the tube, as shown, thereby permitting the tube to intercept the most widely divergent direct rays without necessitating the construction of a tube of unduly great diameter. If the diameter of the tube be too large, its purpose, of course, would be defeated, for the reason that many of the objectionable divergent direct rays would escape through the interior of the tube. In its preferred embodiment, the tube is made of glass formed integral with the front glass 2, and the sides of the tube are rendered partially opaque or semi-transparent by frosting the glass or coloring it so as to render the sides of the tube practically impervious to the direct rays C—D.

The above described device is very effective for intercepting the widely divergent rays C—D from the lamp 3, and thus the objectionable curtain in front of the headlight is eliminated. As the sides of the tube are parallel with the longitudinal axis A—B no interference whatever is offered to the passage of the parallel reflected rays a—b. The direct rays A—D' passing through the interior of the tube do not diverge so widely as the rays A—D and hence are not curtain forming. These rays may be permitted to pass through the front glass without hindrance, or, if desired, they may be intercepted by frosting or coloring that portion of the front glass which lies within the side of the tube.

Fig. 3 shows an arrangement for causing the direct rays A—D' to be projected parallel with the reflected rays. For this purpose, a lens 7 is mounted to cover that portion of the front glass directly in front of the tube, the lens being in diameter substantially equal to the diameter of the tube, and of a character to cause the rays A—D' to be projected parallel with reflected rays.

In Figs. 4 and 5, an arrangement is illustrated which is particularly useful when the headlight is employed for automobile use. As shown the lower portion 8 of the side wall of the tube is left transparent, while the upper portion 9 is made partially opaque. With this arrangement the upper widely divergent direct rays A—D² are intercepted and the lower rays A—D³ permitted to pass through the front glass so as to light that portion of the road directly in front of an automobile. In automobile use, the lower divergent direct rays are not objectionable, because they are beneath the line of vision.

What is claimed is:—

1. A front glass for a projector comprising a transparent glass plate adapted to be mounted in front of the source of light of a projector, said front glass having a frosted glass tube formed integral with the front glass and projecting from the surface of the latter, whereby direct rays from the source of light are arrested by the tube when the plate is mounted in front of a projector.

2. A device for arresting light rays comprising a glass plate adapted to be mounted in front of a source of light and a glass tube formed integral with the glass plate and projecting from the surface of the latter, a portion of the side wall of the tube being made partially opaque, the other portion of the side wall of the tube being transparent, whereby direct rays from the source of light may be arrested by the partially opaque portion of the tube when the glass plate is mounted in front of the source of light.

3. In a headlight, the combination of a reflector, a source of light disposed in the focal center of the reflector and in the longitudinal axis of the latter, a glass plate mounted in front of the reflector and source of light provided with a semi-transparent inwardly projecting glass tube, and a lens mounted in front of the glass tube.

4. In a headlight, the combination of a reflector, a source of light disposed in the focal center of the reflector and in the longitudinal axis of the latter, and a glass plate mounted in front of the reflector and source of light provided with a light ray arresting inwardly projecting glass tube, formed integral with the plate, the longitudinal axis of the tube coinciding with the longitudinal axis of the reflector.

5. In a headlight, the combination of a reflector, a source of light disposed in the focal center of the reflector and in the longitudinal axis of the latter, and a glass plate mounted in front of the reflector and source of light provided with a semi-transparent inwardly projecting glass tube formed integral with the plate, the longitudinal axis of the tube coinciding with the longitudinal axis of the reflector, the portion of the glass plate in front of the tube being semi-transparent to arrest direct rays projected through the interior of the tube.

6. In a headlight, the combination of a reflector, a source of light disposed in the focal center of the reflector and in the longitudinal axis of the latter, and a glass plate mounted in front of the reflector and source of light provided with an inwardly projecting glass tube of which the upper portion of the side wall is treated to arrest direct light rays and the lower portion of the side wall is wholly transparent.

7. In a headlight, the combination of a reflector, an incandescent lamp bulb, disposed in the focal center of the reflector and in the longitudinal axis of the latter, and a glass plate mounted in front of the reflector and source of light provided with an inwardly projecting light arresting glass tube, the diameter of the tube being greater than the vertical diameter of the lamp bulb and the inner end of the tube receiving the forward portion of the lamp bulb.

FRANK M. BLAIR.
FREDERIC M. BLACK.